United States Patent
Nicolia et al.

(10) Patent No.: US 6,679,460 B2
(45) Date of Patent: Jan. 20, 2004

(54) PIPE CLAMP ARRANGEMENT

(75) Inventors: Carl R. Nicolia, Erie, PA (US); Christopher A. Majocka, Erie, PA (US)

(73) Assignee: Zurn Industries, Inc., Erie, PA (US)

( * ) Notice: Subject to any disclaimer, the term of this patent is extended or adjusted under 35 U.S.C. 154(b) by 0 days.

(21) Appl. No.: 10/137,193

(22) Filed: Apr. 30, 2002

(65) Prior Publication Data

US 2002/0171013 A1 Nov. 21, 2002

Related U.S. Application Data

(60) Provisional application No. 60/287,636, filed on Apr. 30, 2001.

(51) Int. Cl.[7] .................................................. F16L 3/12
(52) U.S. Cl. ........................ 248/74.1; 248/70; 248/73; 248/316.5
(58) Field of Search .......................... 248/70, 73, 74.1, 248/316.5, 65, 59, 230.4, 231.51

(56) References Cited

U.S. PATENT DOCUMENTS

| | | | |
|---|---|---|---|
| 1,034,444 A | * | 8/1912 | Hazen .......................... 248/70 |
| 1,043,835 A | | 11/1912 | Hinsdale |
| 1,545,839 A | | 7/1925 | Mason |
| 1,970,707 A | | 8/1934 | Riddell |
| 3,078,477 A | | 2/1963 | Schmid et al. |
| 3,152,784 A | * | 10/1964 | Robinson .................... 248/74.1 |
| 3,273,837 A | | 9/1966 | Willert et al. |
| 3,506,227 A | * | 4/1970 | Jenkins ........................ 248/59 |
| 3,528,634 A | * | 9/1970 | Jenkins ........................ 248/70 |
| 3,559,910 A | | 2/1971 | Babb |
| 3,686,695 A | | 8/1972 | Mielback et al. |
| 4,165,851 A | | 8/1979 | Bowden, Jr. et al. |
| D272,987 S | | 3/1984 | Allen |
| 4,550,451 A | | 11/1985 | Hubbard |
| 4,717,099 A | | 1/1988 | Hubbard |
| D298,915 S | | 12/1988 | Rowley et al. |
| 4,936,478 A | * | 6/1990 | Bozdeck .................... 220/3.92 |
| 4,957,251 A | | 9/1990 | Hubbard |
| 5,050,824 A | * | 9/1991 | Hubbard ..................... 248/57 |
| 5,287,730 A | | 2/1994 | Condon |
| 5,295,278 A | | 3/1994 | Condon et al. |
| D361,503 S | | 8/1995 | Hubbard |
| D376,094 S | | 12/1996 | Hubbard |
| D377,750 S | | 2/1997 | Hubbard |
| D378,988 S | | 4/1997 | Brown et al. |
| D382,195 S | | 8/1997 | Ekern |
| D390,775 S | | 2/1998 | DePietro |
| D399,725 S | | 10/1998 | Baker |
| D410,052 S | | 5/1999 | Davis et al. |
| D425,402 S | | 5/2000 | Welborn et al. |
| 6,095,472 A | | 8/2000 | Hubbard et al. |
| D433,615 S | | 11/2000 | Neider et al. |
| D435,433 S | | 12/2000 | Miller et al. |
| 2002/0011548 A1 | * | 1/2002 | Parker |

* cited by examiner

*Primary Examiner*—Leslie A. Braun
*Assistant Examiner*—Jon Szumny
(74) *Attorney, Agent, or Firm*—Webb Ziesenhiem Logsdon Orkin & Hanson, P.C.

(57) ABSTRACT

A pipe clamp arrangement that includes a body having a tab extending therefrom, a clamp for receiving pipe, and a threaded member having a first end attached to the clamp. The threaded member is threadably secured to the body and a second end of the threaded member is adapted to contact the tab. Rotation of the threaded member adjusts a longitudinal distance between the clamp and the body.

11 Claims, 3 Drawing Sheets

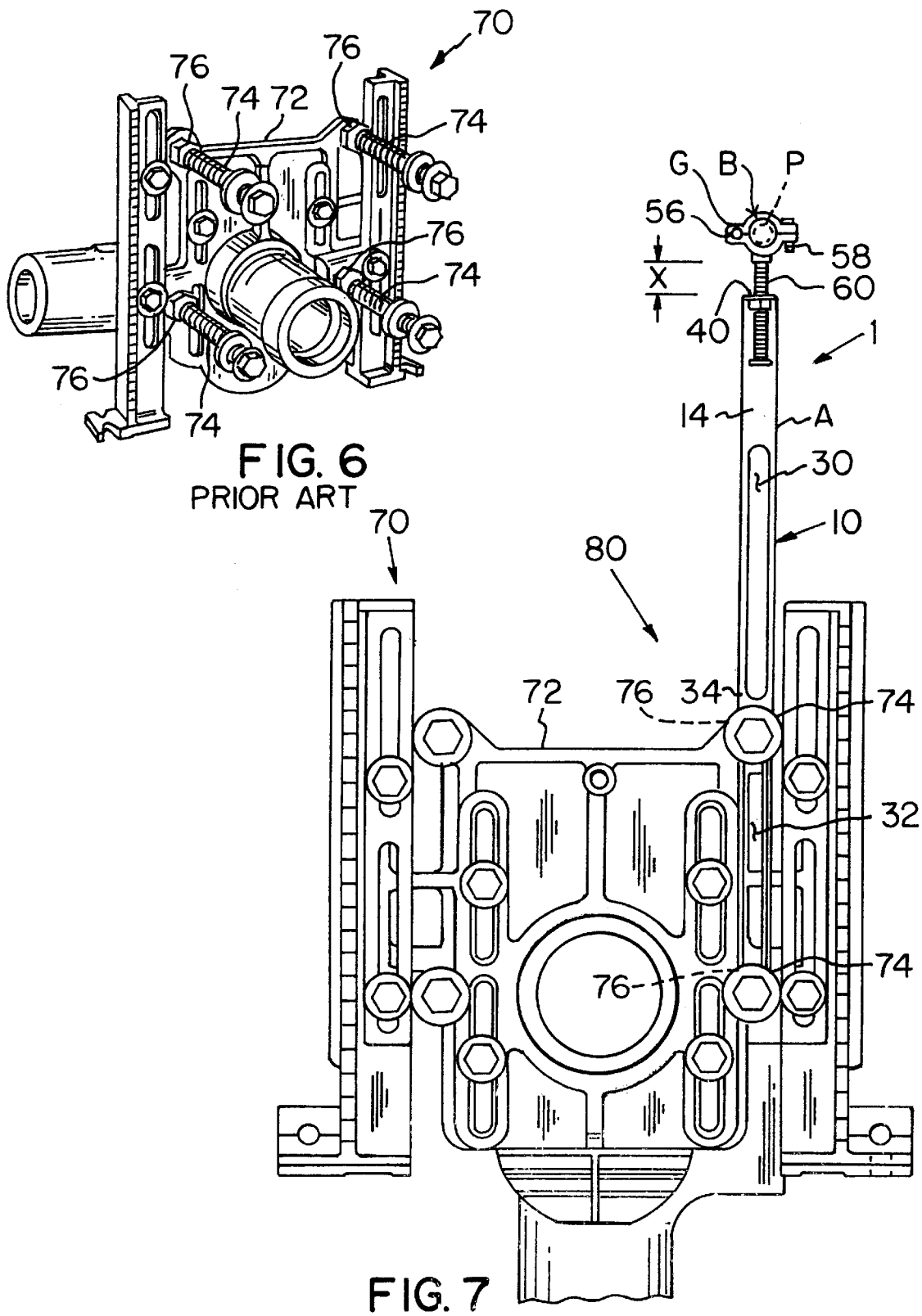

PIPE CLAMP ARRANGEMENT

CROSS REFERENCE TO RELATED APPLICATIONS

This application claims the benefit of U.S. Provisional Patent Application Serial No. 60/287,636, filed Apr. 30, 2001, entitled "Pipe Clamp Arrangement", which is incorporated herein by reference.

BACKGROUND OF THE INVENTION

1. Field of the Invention

The present invention relates to a pipe clamp arrangement which may be used in connection with a siphon jet closet carrier system.

2. Description of the Prior Art

A siphon jet closet carrier system is typically used with installations of plumbing fixtures such as toilets, urinals or drains.

Pressurized water pipes adapted to mate with such plumbing fixtures must be securely fixed in place to prevent vertical, lateral, and axial movements under the stress of use. The pipes must also be located at a predetermined location to precisely align them with the fixture inlets. Typically, a pipe clamp connected to some stationary braces is used to support such pipe.

During installation, the siphon jet will usually be securely fastened in place before installation of the piping. The siphon jet is typically used as the stationary brace in connection with a pipe clamp arrangement to support such piping. Since the precise location of the pipe usually will not be known, a pipe clamp arrangement should not be adjusted before the piping is in its final position. Oftentimes during installation, the piping is installed last. Installation is usually less time consuming when all the fixtures are secured in their fixed locations, including the attachment of the pipe clamp arrangement to the siphon jet before the final installation of the piping. An adjustable pipe clamp arrangement is needed in order to accommodate the variations in the pipe location. Oftentimes, when the pipe clamp arrangement is already fastened to the siphon jet, minor adjustments have to be made to the pipe clamp arrangement in order to properly secure the pipe. In most pipe clamp arrangements, it is difficult to make these minor adjustments without unfastening the entire support bracket. This makes installation more difficult and time consuming. Therefore, it is necessary to provide a pipe clamp arrangement that makes minor adjustments without unfastening the entire support bracket.

Typically, prior art pipe clamp arrangements use a pipe clamp attached to a support bracket having elongated slots. The elongated slots are usually the only means to adjust the pipe clamp arrangement. Even when the pipe clamp arrangement is adjusted to receive the pipe in its fixed location, the pipe clamp arrangement may not be tightly secured as to prevent vertical, lateral, and axial movements of the pipe under the stress of use. Oftentimes, this occurs when the entire support bracket has to be unloosened and then retightened to adjust the pipe clamp arrangement. In most cases, due to improper tightening after adjustments are made, the pipe support bracket becomes loose from the elongated slots loosening, thereby loosening the secured fit of the pipe clamp arrangement to the pipe. When this happens, the pipe clamp arrangement becomes ineffective resulting in movement of the pipe, which can be heard as knocking through the walls in most home installations of plumbing fixtures.

Therefore, it is an object of the present invention to provide a pipe clamp arrangement that overcomes the above-mentioned deficiencies.

SUMMARY OF THE INVENTION

The present invention is a pipe clamp arrangement for securing a pipe during installation of plumbing fixtures. The arrangement includes a longitudinal-extending body, a tab extending from said body, a clamp for receiving pipe, and a threaded member threadably secured to the body. A first end of the threaded member is attached to the clamp. A second end of the threaded member is adapted to contact the tab. Rotation of the threaded member can adjust a longitudinal distance between the clamp and the body when rotated.

The body of the pipe clamp arrangement includes a first wall, a second wall having a first end and a second end, a third wall attached to the second wall, a fourth wall attached to the first end of the second wall, and a fifth wall attached to the second end of the second wall. The first wall, second wall, third wall, fourth wall, and fifth wall define a rectangular-shaped cavity. The body is preferably formed from a unitary piece of metal. The second wall of the body defines an elongated slot for receiving fasteners and a tab slot. Preferably, the second wall of the body defines a first elongated slot and a second elongated slot, a spacer section defined between the first slot and the second slot, a tab slot defined between the first end of the second wall and the first slot, and a tab extending from the tab slot. The tab is rectangular-shaped and extends outwardly from the second wall of the body into the cavity. The tab is adapted to bend a longitudinal distance between the first end and the second end of the second wall. The tab and the body are preferably made of a malleable metal such as carbon steel. The malleable metal can also be plated with copper. An opening is defined in the fourth wall for receiving the threaded member into the cavity of the body. A nut is attached to the fourth wall and is aligned with the opening for threadably receiving the threaded member.

The pipe clamp of the pipe clamp arrangement includes a first clamp portion having a first end and a second end and a second clamp portion also having a first end and a second end. The first end of the first clamp portion is pivotally attached to the first end of the second clamp portion. The second end of the first clamp portion is releasably fastened to the second end of the second clamp portion via a fastener. The second end of the first portion is rotatable about a pivotable axis. The first end of the threaded member is attached to the second clamp portion.

Another embodiment of the present invention is a siphon jet assembly for installation of plumbing fixtures. The assembly includes the pipe clamp arrangement as previously described herein attached to a siphon jet.

The siphon jet has a body member and a plurality of attached spaced-apart threaded fasteners extending from the body member. The pipe clamp arrangement is attached to the body member of the siphon jet via the threaded fasteners.

The present invention is also a method for securing a pipe during installation of plumbing fixtures that includes the steps of providing a pipe clamp arrangement as previously described herein. Next, the pipe clamp arrangement is attached to a body member of a siphon jet. The clamp is then secured to a pipe. The body of the pipe clamp arrangement can be adjusted at a predetermined longitudinal distance before attaching the pipe clamp arrangement to the siphon jet. Also, the threaded member can adjust a longitudinal distance between said clamp and said body by rotating the threadable member until the threaded member contacts the tab. This can occur before fastening the clamp to a pipe. The tab can also be bent a longitudinal distance in order for the threaded member to contact the tab.

BRIEF DESCRIPTION OF THE DRAWINGS

A complete understanding of the invention will be obtained from the following description when taken in connection with the accompanying drawing Figures, wherein like reference characters identify like parts throughout.

FIG. 6 is a front perspective view of the siphon jet shown in FIG. 5; and

FIG. 7 is a front elevational view of a siphon jet assembly made in accordance with the present invention.

DETAILED DESCRIPTION OF THE PREFERRED EMBODIMENTS

Figure 1:
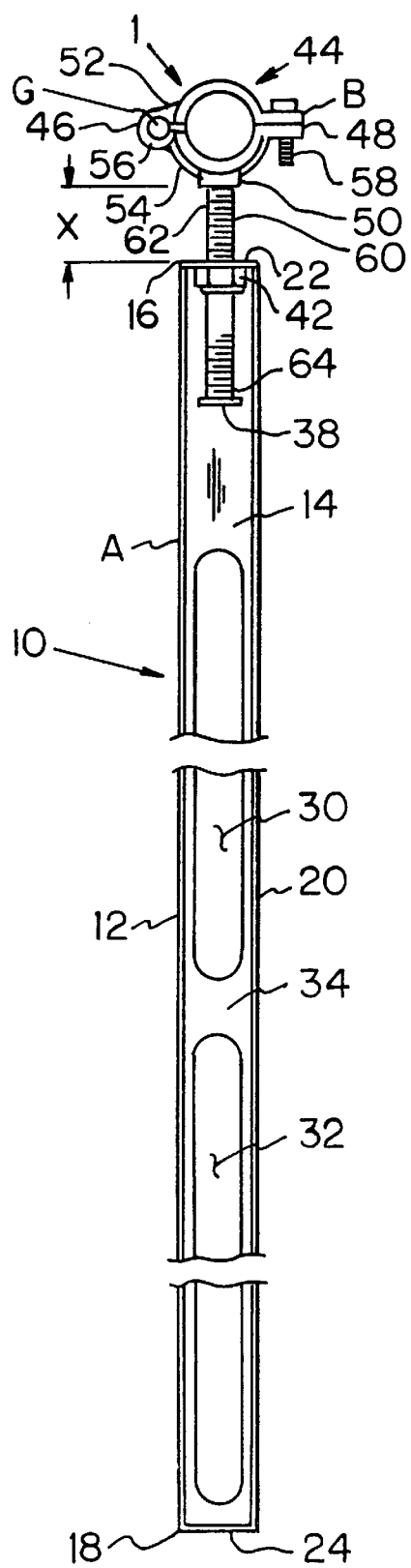
FIG. 1 is a front elevational view of a pipe clamp arrangement made in accordance with the present invention.
Figure 2:
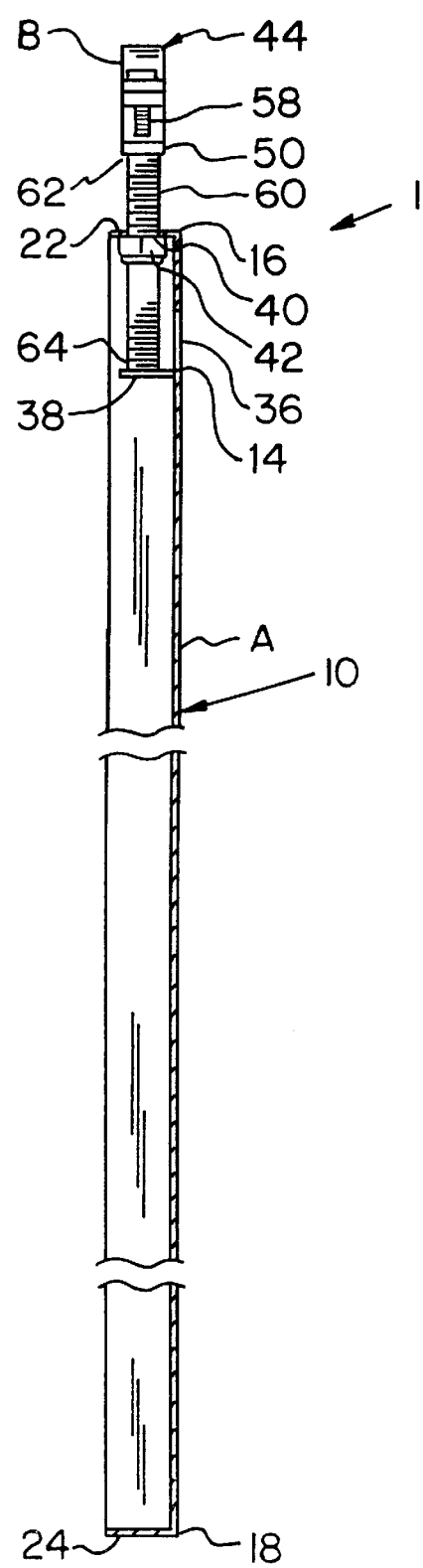
FIG. 2 is a side elevational view, partially in section, of the pipe clamp arrangement shown in FIG. 1, where a pipe clamp body is sectioned.

Referring to FIGS. 1–4, the present invention is a pipe clamp arrangement 1 that has two sections, A and B. The first section A includes a body 10 having a first wall 12, a second wall 14 having a first end 16, and a second end 18, a third wall 20 attached to the second wall 14, a fourth wall 22 attached to the first end 16 of the second wall 18, and a fifth wall 24 attached to the second end 18 of the second wall 14. The first wall 12, second wall 14, third wall 20, fourth wall 22, and fifth wall 24 define a rectangular-shaped cavity 26 (shown in FIG. 3). The body 10 is preferably formed from a unitary piece of malleable metal such as carbon steel.

Figure 3:
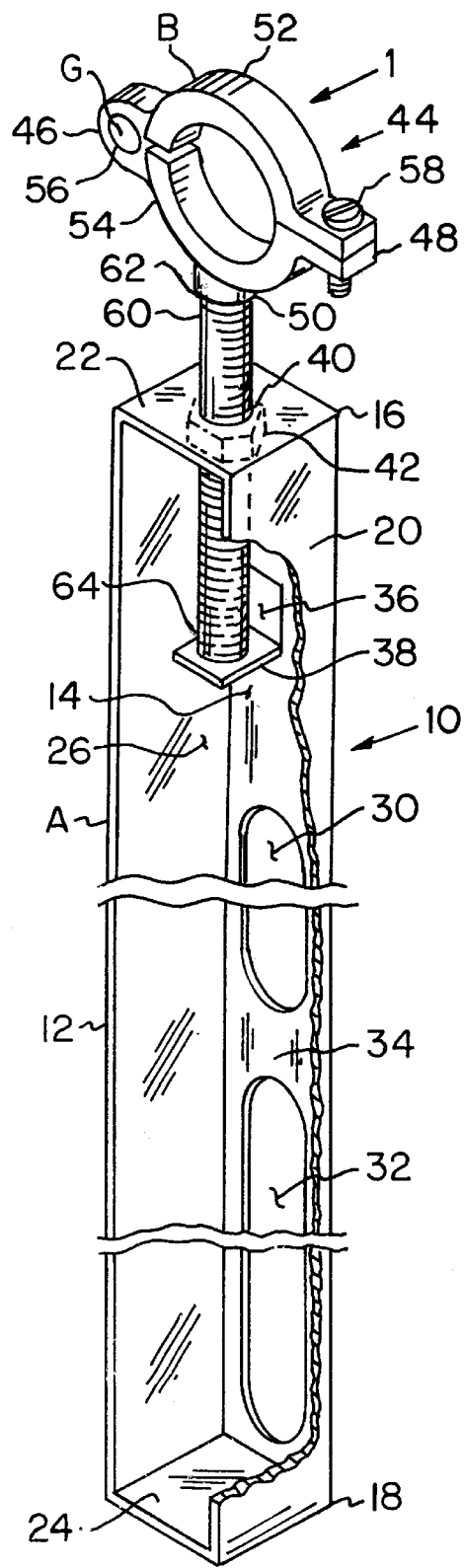
FIG. 3 is a perspective view, partially cut away and in section, of the pipe clamp arrangement shown in FIG. 1.

Referring to FIGS. 1 and 3, the second wall 14 of the body 10 includes a first elongated slot 30 and a second elongated slot 32 for securing fasteners such as a nut and bolt. A spacer section 34 is defined between said first slot 30 and said second slot 32. The slots 30 and 32 may vary in length. A tab slot 36 (shown in FIG. 3) is defined between the first end 16 of the second wall 14 and the first slot 30. A rectangular-shaped tab 38 extends outwardly from the tab slot 36 in a direction toward the cavity 26. The tab 38 is preferably made of the same malleable metal as the body 10 and is adapted to bend a longitudinal distance between the first end 16 and second end 18 at the second wall 14. An opening 40 as shown in FIG. 3 is defined in the fourth wall 22 for receiving a threaded member 60 into the cavity 26 of the body 10. A nut 42 is also attached, preferably by welding, to the fourth wall 22 and is aligned with the opening 40 for threadably receiving the threaded member 60.

Figure 4:
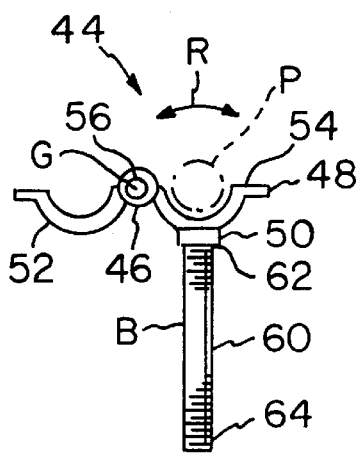
FIG. 4 is a front elevational view of a clamp of the pipe clamp arrangement shown in FIG. 1, showing the clamp in an open position.

Referring to FIGS. 1–4, the second section B includes a pipe clamp 44 having a first end 46, a second end 48, and a bottom end 50 for receiving a pipe P (shown in phantom in FIG. 4). The clamp 44 is preferably made of a malleable metal such as malleable iron. Both the malleable metal clamp 44 and body 10 can be plated with copper. The clamp 44 can also vary in size depending on the diameter of the pipe P. The clamp 44 includes a first clamp portion 52 and a second clamp portion 54. At the first end 46 of the clamp 44, the first clamp portion 52 of the clamp 44 is pivotally attached to the second clamp portion 54 of the clamp 44 by a rivet or pivot pin 56. At the second end 48 of the clamp 44, the first clamp portion 52 is releasably fastened to the second clamp portion 54 via a fastener such as a bolt 58. The clamp bolt 58 is threadably secured through the first clamp portion 52 and the second clamp portion 54 of the clamp 44. The first clamp portion 52 is rotatable R (shown in FIG. 4) about a pivotable axis G.

Referring to FIGS. 1–4, the threaded member 60 having a first end 62 is attached to the bottom end 50 of the first clamp portion 52. A second end 64 of the threaded member 60 is threadably attached to the body 10 through the opening 40 and the nut 42 in the fourth wall 22 of the body 10. Rotation of the threaded member 60 allows the threaded member 60 to adjust a longitudinal distance X (shown in FIG. 1) between the clamp 44 and the body 10 allowing the second end 64 of the threaded member 60 to contact the tab 38. The tab 38 acts as a stop to fix the longitudinal distance of the threaded member 60. The tab 38 can be bent toward the fourth wall 22 of the body 10, thereby increasing the fixed longitudinal distance X of the threaded member 60 between the clamp 44 and the body 10. The tab 38 can also be bent toward the fifth wall 24 of the body 10, thereby decreasing the fixed longitudinal distance X of the threaded member 60 between the clamp 44 and the body 10. The tab 38 can be bent by applying force to the tab 38 with a tool, such as a screwdriver or hammer, or by rotating the clamp 44 so that the second end 64 of the threaded member 60 bends the tab 38.

Figure 5:
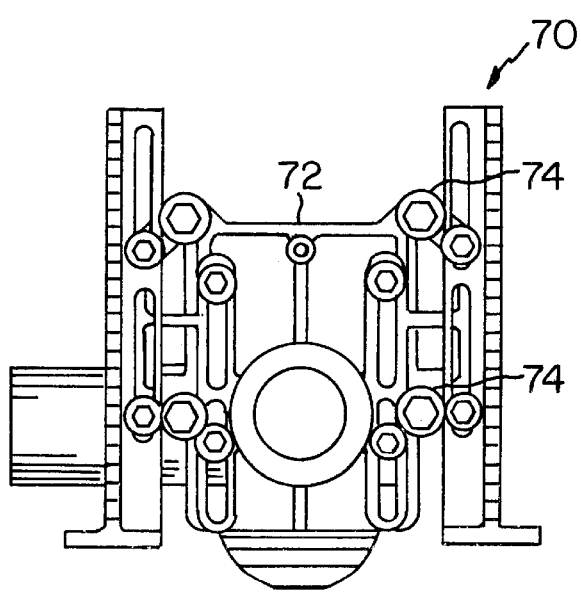
FIG. 5 is a front elevational view of a prior art siphon jet.

FIGS. 5 and 6 show a prior art siphon jet 70 having a body member 72 and four attached spaced-apart bolts 74, with bolt nuts 76 (shown in FIG. 6) extending from the body member 72 for attaching the pipe clamp arrangement 1. The siphon jet 70 is similar to a Zurn 1203 adjustable horizontal siphon jet manufactured by Zurn Industries Inc.

Referring to FIG. 7, the present invention is also a siphon jet assembly 80 that includes the pipe clamp arrangement 1 attached to the body member 72 of the siphon jet 70. The first slot 30 and the second slot 32 of the body 10 receive two of the spaced-apart bolts 74 of the siphon jet 70. The body 10 of the pipe clamp arrangement 1 is securely fastened to the body member 72 of the siphon jet 70 via the bolt nuts 76 (not shown).

Typically, during shipment of plumbing fixtures, the siphon jet 70 and pipe clamp support brackets are shipped separately. In the present invention, the siphon jet assembly 80 is shipped as one complete package. Typically, rotational movement of the threaded member 60 will result if there is nothing to secure the free rotational movement of the threaded member 60. During shipment the tab 38 preferably abuts against the second end 64 of the threaded member 60 to prevent rotation of the threaded member 60.

In operation, a pipe is securely fixed in place to prevent vertical, lateral, and axial movements under the stress of use during the installation of plumbing fixtures via the following: (1) providing a pipe clamp arrangement 1 as previously described herein; and (2) attaching the body 10 of the pipe clamp arrangement 1 to the body member 72 of the siphon jet 70 via the spaced-apart bolts 74 and the bolt nuts 76. After the pipe clamp arrangement 1 is securely fastened to the siphon jet 70, the clamp 44 is ready to receive a pipe. The threaded member 60 is rotated to allow a pipe to position itself on the second clamp portion 54 of the clamp 44. Referring to FIGS. 4 and 7, the first clamp portion 52 is thus pivotally rotated R to position itself around the pipe P (shown in phantom). Finally, securing the clamp 44 to the pipe P is accomplished by threadably engaging the clamp bolt 58 with the first clamp portion 52 and the second clamp portion 54. The clamp 44 is sized to receive a particular diameter pipe, for example, one clamp 44 is adapted to receive a 1 inch or ¾ inch diameter pipe.

Oftentimes, when the pipe clamp arrangement 1 is already securely fastened to the siphon jet 70, adjustments have to be made to the pipe clamp arrangement 1 in order to properly secure the pipe. The pipe clamp arrangement 1 has two separate adjustment locations. A first adjustment is done by unloosening the bolt nuts 76 of the siphon jet 70 and moving the body 10 a predetermined longitudinal distance in order to position the clamp 44 to receive the pipe. The bolt nuts 76 are then tightened holding the body 10 in place. Typically, the first adjustment is not enough to properly position the clamp 44 to receive the pipe. A second adjustment for minor changes is often necessary. This second adjustment is carried out prior to securing the pipe to the clamp 44 by rotating the threaded member 60 a longitudinal distance X (shown in FIG. 7) between the clamp 44 and the body 10. Preferably, after the second adjustment is made, the clamp 44 is usually properly positioned to receive the pipe. After all the adjustments are completed, the second end 64 of the threaded member 60 should be in contact with the tab 38. The tab 38 can be bent a longitudinal distance until the second end 64 of the threaded member 60 contacts the tab 38. However, it is not necessary for the second end 64 of the threaded member 60 to be in contact with the tab 38. When all operational steps are completed, the pipe clamp arrangement 1 is properly secured to the pipe to prevent vertical, lateral, and axial movement of the clamped pipe.

Although the present invention has been described in detail in connection with the discussed embodiments, various modifications may be made by one of ordinary skill in the art without departing from the spirit and scope of the present invention.

We claim:

1. A pipe clamp arrangement for securing a pipe, said arrangement comprising:
    a longitudinal-extending body, said body having a first wall, a second wall having a first end and a second end, a third wall attached to said second wall, a fourth wall attached to said first end of said second wall, and a fifth wall attached to said second end of said second wall, wherein said first wall, said second wall, said third wall, said fourth wall, and said fifth wall define a rectangular-shaped cavity, and wherein said second wall of said body defines a first elongated slot and a second elongated slot, a spacer section defined between the first slot and the second slot, a tab slot defined between said first end of said second wall and the first slot;
    a tab extending from the tab slot of said body;
    a clamp for receiving pipe; and
    a threaded member threadably secured to said body, said threaded member having a first end and a second end, said first end of said threaded member is attached to said clamp and said second end of said threaded member is adapted to contact said tab, whereby rotation of said threaded member adjusts a longitudinal distance between said clamp and said body.

2. The arrangement as claimed in claim 1, wherein said body is formed from a unitary piece of metal.

3. The arrangement as claimed in claim 1, wherein said clamp comprises a first clamp portion having a first end and a second end and a second clamp portion having a first end and a second end, said first end of said first clamp portion pivotally attached to said first end of said second clamp portion, and said second end of said first clamp portion releasably fastened to said second end of said second clamp portion, wherein said second end of said first portion is rotatable about a pivotable axis.

4. The arrangement as claimed in claim 3, wherein said first end of said threaded member is attached to said second clamp portion.

5. The arrangement as claimed in claim 3, wherein said second end of said first clamp portion is releaseably fastened to said second end of said second clamp portion via a fastener.

6. The arrangement as claimed in claim 1, wherein said tab extends from said second wall of said body, and said tab is rectangular-shaped and extends into the cavity.

7. The arrangement as claimed in claim 6, wherein said tab is made of a malleable metal and is adapted to bend a longitudinal distance between said first end and said second end of said second wall.

8. The arrangement as claimed in claim 1, wherein said tab and said body are made of a malleable metal.

9. The arrangement as claimed in claim 8, wherein said malleable metal is copper plated.

10. The arrangement as claimed in claim 1, wherein said body defines an opening in said fourth wall for receiving said threaded member into the cavity of said body.

11. The arrangement as claimed in claim 10, further comprising a nut attached to said fourth wall, said nut aligned with said opening for threadably receiving said threaded member.

* * * * *